United States Patent [19]

Sato et al.

[11] 4,154,277

[45] May 15, 1979

[54] PNEUMATIC TIRE HAVING AN IMPROVED TREAD

[75] Inventors: Nobuo Sato, Kodaira; Isamu Imai, Tokorozawa, both of Japan

[73] Assignee: Bridgestone Tire Company Limited, Tokyo, Japan

[21] Appl. No.: 769,825

[22] Filed: Feb. 17, 1977

[30] Foreign Application Priority Data

Feb. 21, 1976 [JP] Japan .................................. 51/18267

[51] Int. Cl.² .............................................. B60C 1/00
[52] U.S. Cl. ............................ 152/209 R; 152/330 R; 260/42.32
[58] Field of Search ........... 152/330 R, 209 R, 354 R, 152/357 R; 260/42.32, 756; 423/450

[56] References Cited

U.S. PATENT DOCUMENTS

| | | | |
|---|---|---|---|
| 3,307,605 | 3/1967 | Bulgin et al. ..................... | 152/330 R |
| 3,420,913 | 1/1969 | Railsback ....................... | 152/330 R X |
| 3,501,422 | 3/1970 | Nordsick et al. ............. | 152/330 R X |
| 3,830,774 | 8/1974 | Jordan et al. ................. | 260/42.32 X |

*Primary Examiner*—Francis S. Husar
*Assistant Examiner*—D. W. Underwood
*Attorney, Agent, or Firm*—Sughrue, Rothwell, Mion, Zinn and Macpeak

[57] ABSTRACT

A pneumatic tire having a tread formed of a rubber composition consisting essentially of rubber and carbon black having specifically limited iodine adsorbability, dibutyl phthalate absorbability and tinting strength, has excellent cut resistance, chipping resistance, wear resistance and resistance against heat build-up, and is excellent in the running durability on both of paved road and off road.

5 Claims, No Drawings

PNEUMATIC TIRE HAVING AN IMPROVED TREAD

BACKGROUND OF THE INVENTION (1) Field of the Invention:

The present invention relates to a pneumatic tire having an improved tread, and more particularly relates to a steel cord-reinforced pneumatic tire for truck and bus having a tread having improved cut resistance, chipping resistance and wear resistance without deteriorating the resistance against heat build-up during the travelling not only on paved road but also on off road.

(2) Description of the Prior Art:

Recently pneumatic tires for truck and bus have become large in size and travel on road at a higher speed, so that a pneumatic tire having a reinforcing layer containing steel cords embedded therein has often been used. However, such reinforcing layers are highly rigid, and when the tire travels on both paved roads and off roads where stones and rocks are scattered thereon, the tread is apt to be separated due to the heat generated at high speed running and under the heavy load before the tread is completely worn. Further it is apt to be subjected to cut and chipping when the tire rides on the sharp stones and rocks. Therefore, the tread rubber of tire for truck and bus is required to have the resistance against heat build-up, cut resistance and chipping resistance in addition to the wear resistance of the tread rubber itself, and the development of rubber composition for tread having the above described four properties in a well-balanced state has been commercially demanded.

Natural rubber is generally poor in the wear resistance but is high in the cut resistance and chipping resistance, and attempts to improve the wear resistance of natural rubber have been made by compounding a large amount of carbon black having a small particle size and having a high reinforcing property to natural rubber. However, when a large amount of carbon black is compounded to natural rubber, a large amount of softening agent must also be used, and therefore the resulting rubber composition is poor in the resistance against heat build-up, workability, cut resistance and chipping resistance. Hence, a satisfactory rubber composition for tread has not yet been obtained by the use of natural rubber.

While styrene-butadiene rubber has high cut resistance, chipping resistance and wear resistance. It is poor in the resistance against heat build-up, and moreover requires a large amount of softening agent in the processing. Therefore, the resistance against heat build-up of styrene-butadiene rubber is noticeably lowered, and the tread using the styrene-butadiene rubber composition separates, and a satisfactory rubber composition for tread has not yet been obtained by the use of styrene-butadiene rubber.

Reinforcing methods by the use of commonly used carbon black cannot improve both of chipping resistance and wear resistance of rubber. For example, when carbon black, such as ISAF carbon black, which improves the wear resistance of rubber, is compounded to rubber, the chipping resistance of the rubber lowers. When carbon black, such as LS-ISAF carbon black, which improves the chipping resistance of rubber, is compounded to rubber, the wear resistance of the rubber lowers. Therefore, a tread rubber composition suitable for steel cord-reinforced pneumatic tire for truck and bus, which travels on both of paved road and off road, has not yet been obtained.

SUMMARY OF THE INVENTION

The object of the present invention is to provide a steel cord-reinforced pneumatic tire for truck and bus having an improved tread, which is free from the above described drawbacks and satisfies all of the resistance against heat build-up, cut resistance, chipping resistance and wear resistance even when the tire travels on both paved roads and off roads where stones and rocks are scattered thereon.

That is, the present invention provides a steel cord-reinforced pneumatic tire for truck and bus having a tread formed of a rubber composition consisting essentially of 100 parts by weight of a rubber selected from natural rubber, synthetic polyisoprene rubber and a rubber blend, which consists of at least 70% by weight of natural rubber or a synthetic polyisoprene rubber and the remainder being polybutadiene rubber or styrene-butadiene rubber, and 30–60 parts by weight of highly reinforcing carbon black having an iodine adsorbability of 130–150 mg/g, a dibutyl phthalate absorbability of 80–105 ml/100 g and a tinting strength of at least 240%.

DETAILED EXPLANATION OF THE INVENTION

The tire to be used in the present invention is a pneumatic tire having a breaker, which contains steel cords embedded therein, and a tread, which uses a rubber selected from natural rubber, synthetic polyisoprene rubber and a rubber blend, which consists of at least 70% by weight, preferably at least 90% by weight, of natural rubber or synthetic polyisoprene rubber and the remainder being polybutadiene rubber or styrene-butadiene rubber.

The carbon black to be compounded to the rubber for tread is high reinforcing carbon black having an iodine adsorbability of 130–150 mg/g, a dibutyl phthalate adsorbability of 80–105 ml/100 g and a tinting strength of at least 240%.

The iodine adsorbability of carbon black is the amount (mg) of iodine adsorbed to 1 g of the carbon black in dry state, measured according to JIS K6221. Carbon black having a smaller particle size has a higher iodine absorbability.

The dibutyl phthalate absorbability of carbon black is the amount (ml) of dibutyl phthalate absorbed in 100 g of the carbon black in dry state, measured according to JIS K6221 (Method A (mechanical method)). The dibutyl phthalate absorbability of carbon black has a positive correlation with the structure of carbon black.

The tinting strength of carbon black was measured in the following manner. 0.1 g of a carbon black sample is fully kneaded together with 3 g of zinc white and 1.5 cc of linseed oil by means of a Hoover muller (kneading condition: (25 revolutions/one kneading)×5 times, total 125 revolutions, load 15 pounds). The resulting mixture is extended into a film having a thickness of 0.002 inch on a glass plate by means of a film applicator, and the reflectivity T of the film is measured by means of a relfective spectrophotometer (Densichron, made by Welch Scientific Co.), which has previously been adjusted by the use of a standard plate having a reflectivity of 50%. As a standard carbon black, Sterling S (SRF) is used, and the reflectivity of Sterling S is defined as 100%, and the tinting strength of the above obtained film is calculated by the following formula.

$$(50/T) \times 100 = \text{Tinting strength (\%)}$$

It is generally considered that the tinting strength of carbon black is highly influenced by the particle size and the structure of the carbon black. The Industry Reference Black #3 (IRB #3) has a tinting strength of 208% measured in the above described method.

Commonly used carbon blacks have the following iodine adsorbability (abbreviated as IA), dibutyl phthalate absorbability (abbreviated as DBP) and tinting strength (abbreviated as TINT). That is, SAF carbon black has an IA of 130-152 mg/g, a DBP of 109-121 ml/100 g and a TINT of 230-272%. ISAF carbon black has an IA of 110-130 mg/g, a DBP of 100-120 ml/100 g and a TINT of 206-244%. LS-ISAF carbon black has an IA of 101-125 mg/g, a DBP of 69-84 ml/100 g and a TINT of 210-254%. LM-ISAF carbon black has an IA of 115-130 mg/g, a DBP of 85-97 ml/100 g and a TINT of 234-250%.

The inventors have made investigations by compounding various carbon blacks to rubber, and found out that carbon black having an IA of less than 130 mg/g lowers noticeably the wear resistance of rubber, while carbon black having an IA of more than 150 mg/g generates a large amount of heat in rubber, that carbon black having a DBP of less than 80 ml/100 g lowers the Young's modulus and wear resistance of rubber, while carbon black having a DBP of more than 105 ml/100 g lowers noticeably the chipping resistance of rubber, and that carbon black having a TINT of less than 240% lowers the shear strength of rubber, causing the lowering of the chipping resistance of the rubber. As the result, the present invention has been accomplished.

That is, in the present invention, there is used carbon black having an iodine adsorbability of 130-150 mg/g, a dibutyl phthalate absorbability of 80-105 ml/100 g and a tinting strength of at least 240%. Such carbon black is entirely different from commonly used carbon blacks in the range of the values of the above described three properties. The inventors have developed a rubber composition, which has satisfactorily high resistance against heat build-up, cut resistance, chipping resistance and wear resistance in a well-balanced state, by compounding the carbon black to rubber.

The amount of the carbon black to be compounded to rubber is 30-60 parts by weight, preferably 35-55 parts by weight, based on 100 parts by weight of rubber. When the amount is smaller than 30 parts by weight, the resulting rubber composition is poor in the wear resistance and cut resistance in the travelling on paved road. When the amount is larger than 60 parts by weight, the resulting rubber composition is poor in the wear resistance and resistance against heat build-up in the travelling on off road, where sharp stones and rocks are scattered thereon.

In the production of the rubber composition for tread of the pneumatic tire of the present invention, commonly used chemicals, such as softening agent, vulcanizing agent, vulcanization accelerator and antioxicant, are compounded to rubber in addition to the above described carbon black by a conventional method.

The cords to be used for tire carcass are not particularly limited, and for example, inorganic fiber cords, such as steel cords, glass cords and the like, and organic fiber cords, such as nylon cords, polyester cords, rayon cords and the like may be used.

The steel cord-reinforced pneumatic tire for truck and bus, which uses a rubber composition having the above described composition as a tread, hardly causes the wear separation, cut and chipping of the tread even when the tire travels on both paved roads and off roads at a high speed and under a heavy load as compared with conventional tires. Therefore, the tire has a remarkably high running durability.

The following examples are given for the purpose of illustration of this invention and are not intended as limitations thereof. In the examples, "parts" mean parts by weight unless otherwise indicated.

EXAMPLE 1

A rubber composition consisting of 100 parts of natural rubber, 46 parts of each of various carbon blacks shown in the following Table 1, 1 part of stearic acid, 3.7 parts of zinc white, 1 part of antioxidant, 1.3 parts of sulfur and 1.1 parts of vulcanization accelerator was used as a tread, and steel cord-reinforced pneumatic tires of 1000-20, 14 PR type having a carcass and a breaker, each containing steel cord layer embedded therein, were produced. In the production of the tires, the tread of one tire was divided into 3 sections, and one tire was produced so that te tread was composed of 3 kinds of tread samples using different carbon blacks. That is, one of the tires has a tread consisting of, for example, tread sample Nos. 1, 2 and 3, and the other tire has a tread consisting of, for example, tread samples Nos. 3, 4 and 5.

The wear resistance, chipping resistance and cut resistance of the tread samples were tested in the following manner. The obtained results are shown in Table 1.

(1) Wear Resistance:

In the test of the wear resistance on paved road, a tire is run on a paved road having a paved percentage of at least 80% at an average speed of about 55 km/hr under a load of about 2,500 kg per one tire until the tread groove is worn by 1 mm.

In the test of wear resistance on off road, a tire is run on an off road having a paved percentage of lower than 80% at an average speed of about 30 km/hr under the same load as described above until the tread groove is worn by 1 mm.

The wear resistance of a tread sample is shown by the ratio of the running distance of the tread sample to that of tread sample No. 3 using ISAF carbon black, the latter distance being defined as 100.

(2) Chipping Resistance:

Chipping is a peeling phenomenon of tread rubber, which occurs often when a tire travels on a road having at least 20% of non-paved area, and is one of the main factors which decrease the running distance of tire. The chipping resistance of a tread sample is evaluated by the ratio of the tread sample to that of tread sample No. 3 using ISAF carbon black, the latter resistance being defined as 100. The higher is the ratio in a tread sample, the higher the chipping resistance of the tread sample is.

(3) Cut Resistance:

Wedge-shaped cuts are often formed momentarily in the tread rubber at a quarry, where sharp stones are scattered thereon, and the life of tire is shortened by the formation of a large amount of the wedge-shaped cuts in the tread. The cut resistance of a tread sample is evaluated by the ratio of the cut resistance of the tread sample to that of tread sample No. 3 using ISAF carbon black, the latter resistance being defined as 100. The higher is the ratio in a tread sample, the higher the cut resistance of the tread sample is.

Further, the resistance against heat build-up of te above described rubber compositions used for the tread samples was tested in the following manner, and the obtained results are also shown in Table 1.

(4) Resistance Against Heat Build-Up:

A cylindrical test piece having a diameter of 1 inch and a height of 1 inch is prepared from a rubber composition sample and is subjected to a dynamic strain of 22.5% under a load of 60 pounds at a rate of 1,800 rpm by means of a Goodrich flexometer, and the heat generated in the test piece is measured by means of a thermocouple inserted into the central portion of the test piece. The resistance against heat build-up of a rubber composition sample is evaluated by the ratio of the resistance against heat build-up of the rubber composition sample to that of the rubber composition sample No. 3 containing ISAF carbon black, the latter resistance being defined as 100. The higher is the ratio in a rubber composition sample, the higher the resistance against heat build-up of the rubber composition sample.

Table 1

| Tread sample No. | Tread of the present invention | | Comparative tread | | | |
|---|---|---|---|---|---|---|
| | 1 | 2 | 3* | 4** | 5*** | 6 |
| Property of carbon black | | | | | | |
| Iodine adsorbability: IA(mg/g) | 135 | 139 | 121 | 140 | 11 | 120 |
| Dibutyl phthalate adsorbability: DBP(ml/100g) | 90 | 103 | 114 | 113 | 78 | 113 |
| Tinting strength: TINT (%) | 250 | 245 | 230 | 240 | 230 | 265 |
| Test result | | | | | | |
| Wear resistance on paved road | 120 | 125 | 100 | 114 | 90 | 125 |
| Wear resistance on off road | 115 | 110 | 100 | 100 | 100 | 95 |
| Chipping resistance | 200 | 160 | 100 | 130 | 200 | 100 |
| Cut resistance | 80 | 85 | 100 | 100 | 50 | 100 |
| Resistance against heat build-up | 97 | 94 | 100 | 95 | 103 | 94 |

*ISAF carbon black
**SAF carbon black
***LS-ISAF carbon black

EXAMPLE 2

Steel cord-reinforced pneumatic tires were produced in the same manner as described in Example 1, except that a rubber composition consisting of 100 parts of a rubber blend, which consisted of 70 parts of natural rubber and 30 parts of polybutadiene rubber, and 46 parts of each of various carbon blacks shown in the following Table 2, 1 part of stearic acid, 4.0 parts of zinc white, 1 part of antioxicant, 1.5 parts of sulfur, 1.0 part of vulcanization accelerator and 0.2 part of retardant was used as a tread. The wear resistance, chipping resistance and cut resistance of tread samples were tested in the same manner as described in Example 1, and the obtained results are shown in Table 2. Further, the resistance against heat build-up of the above described rubber compositions used for the tread samples was tested in the same manner as described in Example 1, and the obtained results are also shown in Table 2.

Table 2

| Tread sample No. | Tread of the present invention | | Comparative tread | | |
|---|---|---|---|---|---|
| | 1 | 2 | 3* | 4** | 5*** |
| Property of carbon black | | | | | |
| Iodine adsorbability: IA(mg/g) | 135 | 139 | 121 | 140 | 111 |
| Dibutyl phthalate adsorbability: DBP(ml/100 g) | 90 | 103 | 114 | 113 | 78 |
| Tinting strength: TINT (%) | 250 | 245 | 230 | 240 | 230 |
| Test result | | | | | |
| Wear resistance on paved road | 115 | 120 | 100 | 110 | 85 |
| Wear resistance on off road | 110 | 105 | 100 | 100 | 95 |
| Chipping resistance | 190 | 150 | 100 | 120 | 200 |
| Cut resistance | 90 | 90 | 100 | 100 | 50 |
| Resistance against heat build-up | 95 | 91 | 100 | 94 | 101 |

*ISAF carbon black
**SAF carbon black
***LS-ISAF carbon black

It can be seen from the test results shown in Tables 1 and 2 that the rubber composition containing specifically limited carbon black of the present invention is superior in the wear resistance to that containing SAF carbon black and is almost equal in the chipping resistance to that containing LS-ISAF carbon block. Therefore, the steel cord-reinforced pneumatic tire of the present invention, which uses a rubber composition containing the specifically limited carbon black in the tread, is smaller than conventional tires in the wear, separation, cut and chipping of tread even when the tire is run on both of paved road and off road at a high speed and under a heavy load, and is excellent in the running durability.

What is claimed is:

1. A pneumatic tire having a tread formed of a rubber composition consisting essentially of 100 parts by weight of natural rubber or synthetic polyisoprene rubber and 30-60 parts by weight of highly reinforcing carbon black having an iodine adsorbability of 130-150 mg/g, a dibutyl phthalate absorbability of 80-105 ml/100 g and a tinting strength of at least 240%.

2. A pneumatic tire having a tread formed of a rubber composition consisting essentially of 100 parts by weight of a rubber blend, which consists of at least 70% by weight of natural rubber or synthetic polyisoprene rubber and the remainder being diene series synthetic rubber, and 30-60 parts by weight of highly reinforcing carbon black having an iodine adsorbability of 130-150 mg/g, a dibutyl phthalate adsorbability of 80-105 ml/100 g and a tinting strength of at least 240%.

3. A pneumatic tire according to claim 2, wherein said rubber blend, consists of at least 90% by weight of natural rubber or synthetic polyisoprene rubber and the remainder being diene series synthetic rubber.

4. A pneumatic tire according to claim 2, wherein said diene series synthetic rubber is polybutadiene rubber.

5. A pneumatic tire according to claim 2, wherein said diene series synthetic rubber is styrene-butadiene rubber.

* * * * *